(12) United States Patent
Asghar et al.

(10) Patent No.: US 9,326,169 B2
(45) Date of Patent: Apr. 26, 2016

(54) CELL DEGRADATION DETECTION

(75) Inventors: Muhammad Zeeshan Asghar, Jyväskylä (FI); Richard Kurt Fehlmann, Helsinki (FI); Ingo Viering, Munich (DE); Szymon Stefanski, Nowy Sacz (PL)

(73) Assignee: Nokia Solutions and Networks Oy, Espoo (FI)

( * ) Notice: Subject to any disclaimer, the term of this patent is extended or adjusted under 35 U.S.C. 154(b) by 374 days.

(21) Appl. No.: 13/823,306

(22) PCT Filed: Sep. 14, 2010

(86) PCT No.: PCT/EP2010/063495
§ 371 (c)(1),
(2), (4) Date: May 2, 2013

(87) PCT Pub. No.: WO2012/034588
PCT Pub. Date: Mar. 22, 2012

(65) Prior Publication Data
US 2013/0215734 A1     Aug. 22, 2013

(51) Int. Cl.
*H04W 24/04* (2009.01)
*H04W 24/02* (2009.01)
*H04W 48/20* (2009.01)

(52) U.S. Cl.
CPC .............. *H04W 24/04* (2013.01); *H04W 24/02* (2013.01); *H04W 48/20* (2013.01)

(58) Field of Classification Search
CPC ......... H04L 45/28; H04L 45/22; H04L 29/14; H04L 45/00; H04L 12/2422; H04L 43/50; H04L 12/2697; H04L 43/00; H04L 12/2602; H04J 3/14; H04W 24/02; H04W 24/04; H04W 48/20
See application file for complete search history.

(56) References Cited

U.S. PATENT DOCUMENTS

| 2003/0129979 | A1 | 7/2003 | Cooper ........................ 455/432 |
| 2004/0087305 | A1* | 5/2004 | Jiang ..................... H04W 48/18 455/432.1 |
| 2007/0066034 | A1 | 3/2007 | Baskaran et al. ............. 438/473 |
| 2007/0066304 | A1 | 3/2007 | Lee ................. 455/436 |
| 2007/0249291 | A1* | 10/2007 | Nanda ............... H04W 36/0083 455/73 |

FOREIGN PATENT DOCUMENTS

EP    1 786 233 A2    5/2007

OTHER PUBLICATIONS

3GPP TS 36.304 V8.7.0 (Sep. 2009), titled 3rd Generation Partnership Project; Technical Specification Group Radio Access Network; Evolved Universal Terrestrial Radio Access (E-UTRA); User Equipment (UE) procedures in idle mode (Release 8) was published Dec. 2009.*

*Primary Examiner* — Andrew Lai
*Assistant Examiner* — Hoyet H Andrews
(74) *Attorney, Agent, or Firm* — Harrington & Smith

(57) ABSTRACT

There is provided a solution for detecting a condition of at least one cell. The solution includes determining, for each predetermined channel, the number of failed attempts in establishing a connection to a cell, and communicating the information to the next connected cell. The cell may then apply the information in determining whether a cell is degraded or not.

20 Claims, 5 Drawing Sheets

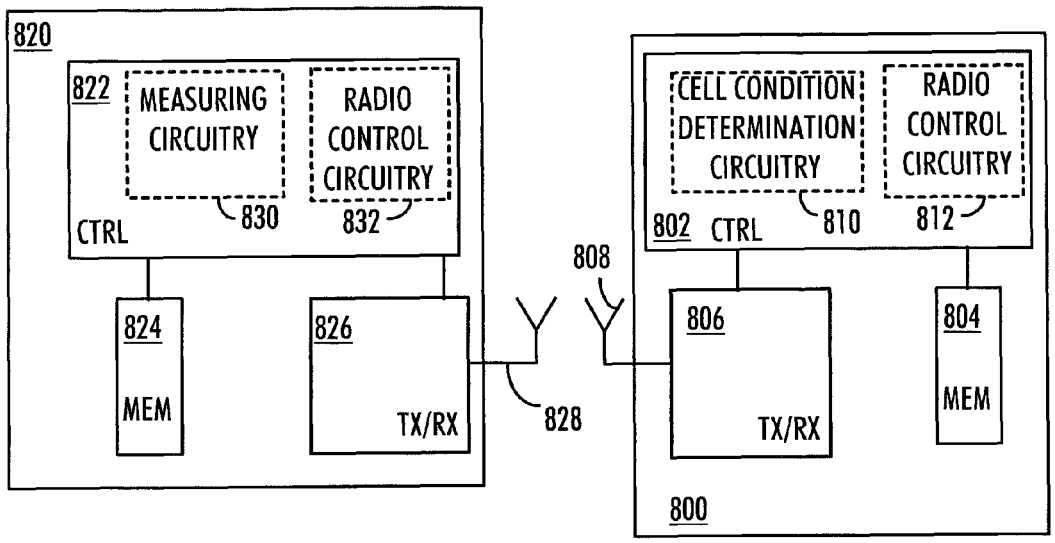
FIG. 8
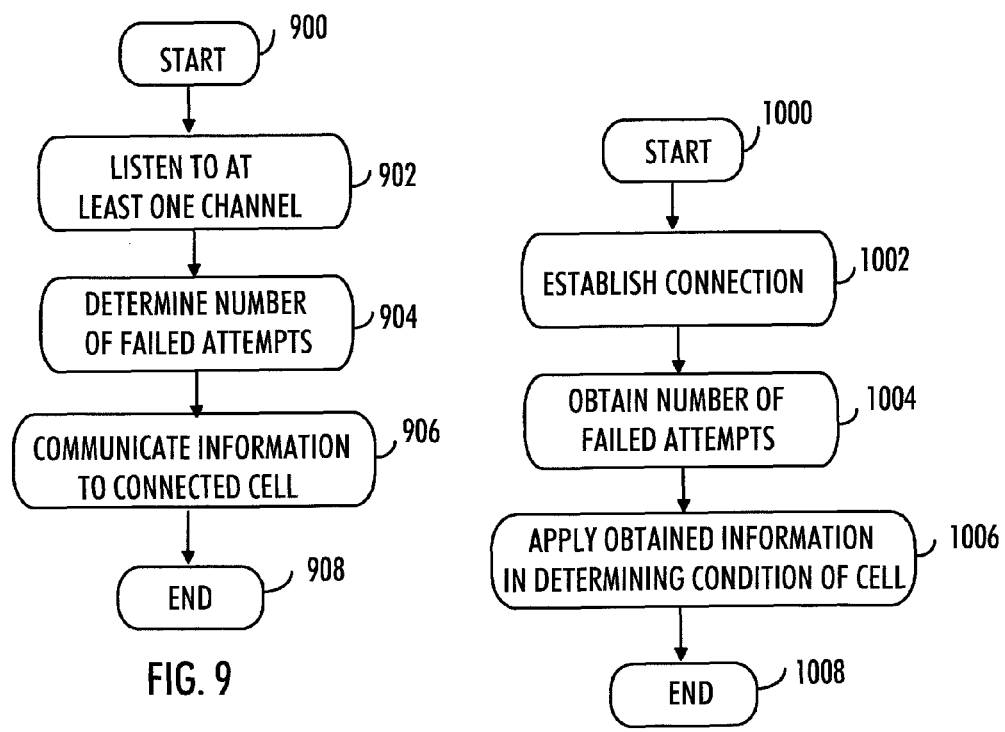
FIG. 9
FIG. 10

CELL DEGRADATION DETECTION

FIELD

The invention relates generally to mobile communication networks. More particularly, the invention relates to analyzing cell condition in a mobile communication network.

BACKGROUND

In radio communication networks, such as the Long Term Evolution (LTE) or the LTE-Advanced (LTE-A) of the $3^{rd}$ Generation Partnership Project (3GPP), network planning comprises the use of common base stations (Node B, NB). The eNB typically provides radio coverage for a certain geographical area and performs radio resource management related activities such as providing cell selection related information to user equipments (UE).

In order for the UE to communicate with eNB, there needs to be a radio link between the UE and the eNB. In order to create the radio link, the UE needs to perform the cell selection procedure when the UE is powered on or emerges in a certain area. However, it may occur that the cell selection does not succeed and, as a result, the UE is not able to establish the radio link to any eNB.

BRIEF DESCRIPTION OF THE INVENTION

Embodiments seek to improve the determination of a cell condition in the mobile communication network.

According to an aspect of the invention, there are provided methods as specified in claims 1 and 16.

According to an aspect of the invention, there are provided apparatuses as specified in claims 8, 15, 24 and 32.

According to an aspect of the invention, there are provided computer program product as specified in claims 33 and 34.

Embodiments of the invention are defined in the dependent claims.

LIST OF DRAWINGS

In the following, the invention will be described in greater detail with reference to the embodiments and the accompanying drawings, in which FIG. 1 presents a radio communication network according to an embodiment;

FIG. 8 shows apparatuses according to embodiments;

FIG. 9 shows a method for determining a condition of a cell, according to an embodiment; and FIG. 10 shows a method for communicating information to a cell, according to an embodiment.

DESCRIPTION OF EMBODIMENTS

The following embodiments are exemplary. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

Radio communication networks, such as the Long Term Evolution (LTE) or the LTE-Advanced (LTE-A) of the $3^{rd}$ Generation Partnership Project (3GPP), are typically composed of at least one base station (also called a base transceiver station, a Node B, or an evolved Node B, for example), a user equipment (also called a user terminal and a mobile station, for example) and optional network elements that provide the interconnection towards the core network. The base station connects the UEs via the so-called radio interface to the network.

Figure 1:
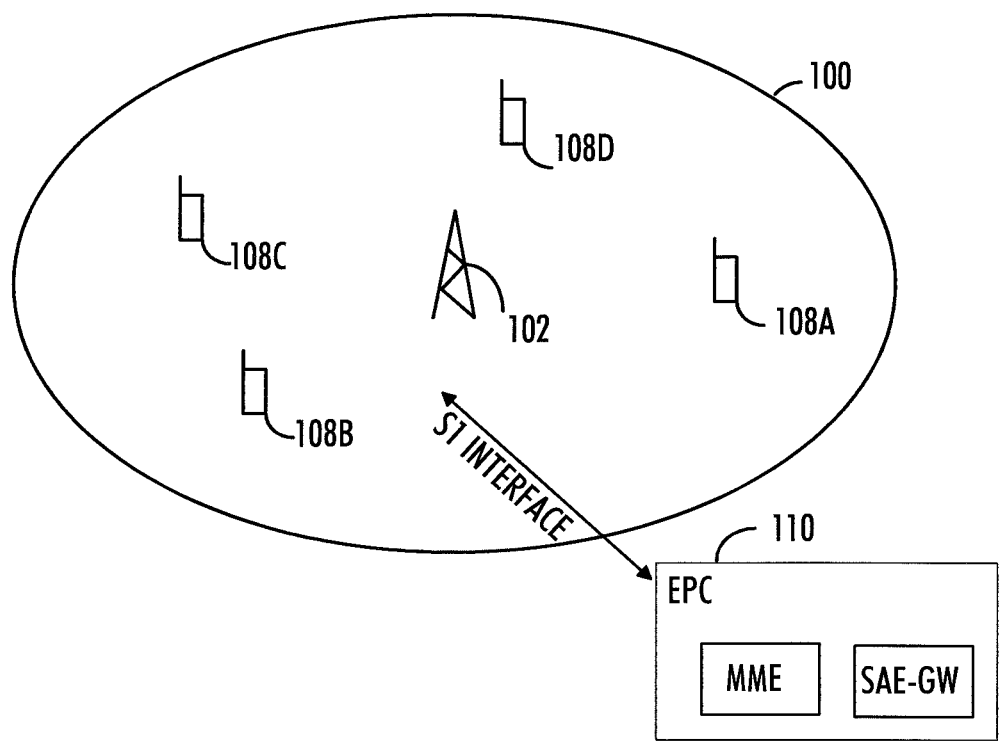

FIG. 1 shows a communication network, according to an embodiment. As explained, the communication network may comprise a base station 102. The base station 102 may provide radio coverage to a cell 100, control radio resource allocation, perform data and control signaling, etc. The cell 100 may be a macrocell, a microcell, or any other type of cell where radio coverage is present. Further, the cell 100 may be of any size or form, depending on the antenna system utilized.

In general, a base station 102 applicable to the embodiments may be configured to provide communication services according to at least one of the following communication protocols: Worldwide Interoperability for Microwave Access (WiMAX), Universal Mobile Telecommunication System (UMTS) based on basic wideband-code division multiple access (W-CDMA), high-speed packet access (HSPA), LTE, and/or LTE-A. The base station 102 may additionally provide the second generation cellular services based on GSM (Global System for Mobile communications) and/or GPRS (General Packet Radio Service). The present embodiments are not, however, limited to these protocols.

The base station 102 may be used in order to provide radio coverage to the cell 100. The base station 102 may be seen as one communication point of the network. The base station 102 may be node B, evolved node B (eNB) as in LTE-A, a radio network controller (RNC), or any other apparatus capable of controlling radio communication and managing radio resources within the cell 100. The base station 102 may also have an effect on mobility management by controlling and analyzing radio signal level measurements performed by a user terminal, carrying out its own measurements and performing handover based on the measurements.

For the sake of simplicity of the description, let us assume that the base station is an eNB. The development of the evolved universal mobile telecommunication's system (UMTS) terrestrial radio access network (E-UTRAN), which is the air interface of the LTE, is concentrated on the eNB 102. All radio functionality is terminated here so that the eNB 102 is the terminating point for all radio related protocols. The E-UTRAN may be configured such that orthogonal frequency division multiple access (OFDMA) is applied in downlink transmission, whereas single carrier frequency division multiple access (SC-FDMA) may be applied in uplink, for example. In the case of multiple eNBs in the communication network, the eNBs may be connected to each other with an X2 interface as specified in the LTE.

The eNB 102 may be further connected via an S1 interface to an evolved packet core (EPC) 110, more specifically to a mobility management entity (MME) and to a system architecture evolution gateway (SAE-GW). The MME is a control plane for controlling functions of non-access stratum signaling, roaming, authentication, tracking area list management, etc., whereas the SAE-GW handles user plane functions including packet routing and forward-ing, E-UTRAN idle mode packet buffering, etc. The user plane bypasses the MME plane directly to the SAE-GW. The SAE-GW may comprise two separate gateways: a serving gateway (S-GW) and a packet data network gateway (P-GW). The MME controls the tunneling between the eNB and the S-GW, which serves as a local anchor point for the mobility between different eNBs, for ex-ample. The S-GW may relay the data between the eNB and the P-GW, or buffer data packets if needed so as to release them after appropriate tunneling has been established to a corresponding eNB. Further, the MMEs and the SAE-GWs may be pooled so that a set of MMEs and SAE-GWs may be as-signed to serve a set of eNBs. This means that an eNB may be connected to multiple MMEs and SAE-GWs, although each user terminal is served by one MME and/or S-GW at a time.

According to an embodiment, the eNB 102 may establish a connection with a user equipment (UE) 108A to 108D such as a mobile user terminal, a palm computer, or any other apparatus capable of operating in a mobile communication network. That is, the UE 108A to 108D may perform data communication with the eNB 102.

Figure 2:
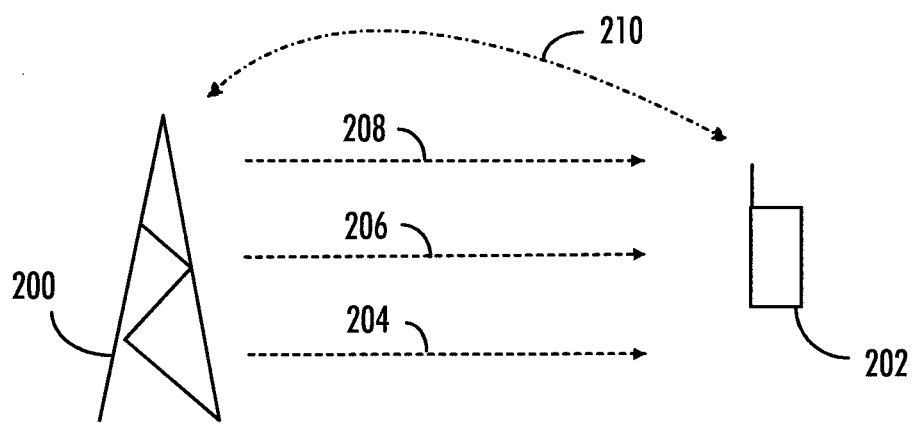
FIG. 2 shows another radio communication network according to an embodiment.

FIG. 2 shows how a connection may be established to a base station providing a radio coverage to a cell. In communication network systems, the UE 202 may apply physical channels to get connected to the eNB 200 of the network. If one of the physical channels 204 to 208 of the eNB 200 is faulty, then a priori neither the eNB 200 nor the UE 202 may be aware of the faulty channels. If they are in contact with each other, it is advisable that they exchange information on possible faults in the physical channels 204 to 208. In an embodiment, the UE 202 listens to at least one predetermined channel 204 to 208 in order to select a cell to which a connection is to be established. This may be called an initial cell selection (ICS). The ICS may be triggered when the UE 202 is powered on, for example. The ICS procedure is explained later in detail.

Let us take a look at possible physical channels applied in a communication network, such as in the LTE. The physical channels include downlink and uplink channels. The downlink channels include a physical downlink shared channels (PDSCH) for user data and control message, a one to many (multicast) channel that can send media to specific groups of receivers, a physical downlink control channel (PDCCH) fro transmitting control information, a broadcast channel (BCH) to transfer messages and media to all mobiles in a coverage area, a synchronization channel (SCH) that allows the UE to obtain information related to the eNB, a paging channel used to carry information to the UE in order to enable the UE to change from RRC_IDLE to RRC_CONNECTED, and a transmission flow signaling channel (PHICH). The SCH may be divided to primary SCH and to a secondary SCH, wherein the primary SCH is used to synchronize timing during cell search and the secondary SCH is used to synchronize timing and to transmit cell group identification during cell search. The uplink physical channels include a physical random access channel (PRACH), a shared user data and control message transmission channel (PUSCH), and a control channel (PUCCH).

According to ICS, the UE 202 chooses the strongest cell after scanning the available frequencies. The strongest cell may be determined by analyzing the received power from different eNBs. The channels 204 to 208 that are listened to may comprise at least one of the following: a synchronization channel 204, a broadcast channel 206 and a paging channel 208. In an embodiment, each of these three channels is listened to in the ICS process. Alternatively, there may be less or more channels that need to be successfully listened to in order for the ICS to be successful. In case one of these channels is faulty, the cell selection procedure may not succeed for that cell and the UE may get stuck until it finds a stronger signal of another cell. Therefore, the cell to which a connection will be established may be the first selected cell, or another cell in case a connection could not be established to the first selected cell.

In case the UE 202 makes a handover and the synchronization channel of the target cell is faulty, the UE coming from a source may not be able to connect to the target cell and may stay connected with the source cell. After a while UE's connection with the source cell will be dropped and the UE acts as if it is in a coverage hole-area. By coverage hole-area it is meant a geographically limited area in which the UE 202 cannot receive signal from any eNB. The reason for this may be that the area is blocked from any of the eNBs by a dense forest, for example. Alternatively, the user may be in a tunnel that prevents the signal from nay eNB to reach the UE 202, for example. As a result, the UE 202 cannot connect to any eNB and, in practice, cannot access the network for performing calls, data transfer, etc.

Figure 3:
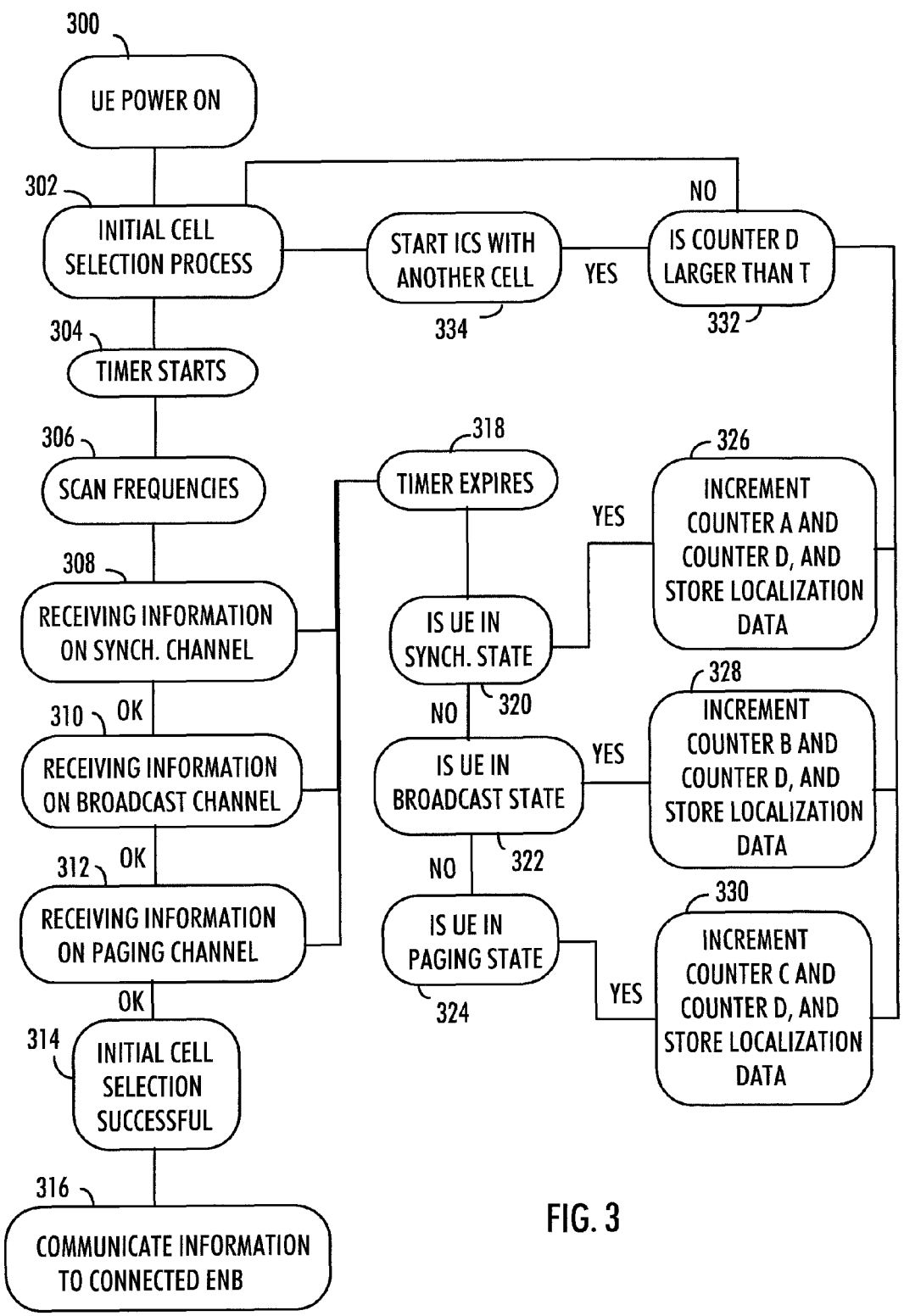
FIG. 3 shows a flow diagram of an embodiment.

Let us take a closer look of the ICS procedure with reference to FIGS. 2 and 3. In an embodiment, the UE 202 is first powered on in step 300. In step 302, the ICS process is triggered. In step 306, the UE 202 scans all radio frequencies in the frequency band in question, such as in the E-UTRA bands, in order to find a suitable cell. The first selected cell may be the cell with corresponding eNB 200 which provide the strongest signal to the UE 202. The UE 202 may also have stored information regarding available frequencies in the communication network. The information may be preconfigured to the UE 202. In step 308, the UE 202 first listens to the synchronization channel (SCH) 204 transmitted by the eNB 200 in a downlink. Once the UE 202 obtains the synchronization from the eNB 200, the UE 202 gets the physical identification (ID) of the cell of the eNB 202. Then, in step 310, the UE 202 starts listening to the broadcast channel (BCH), which carries the information needed to access the network, such as uplink random access channel parameters (RACH), etc. When the 202 UE successfully obtains the data from BCH, it may start listening to the paging channel (PCH) in step 312. The PCH contains paging information to the UE 202. The PCH channel is used to alert the mobile station of an incoming call, etc. When the UE 202 successfully receives data from all of the three channels, the UE 202 declares successful ICS process in step 314. Once the connection has been established successfully, the UE 202 and the eNB 200 may communicate with each other via a connection 210.

However, the predetermined channels that are listened to may be faulty so that the information comprised in the channel is not successfully received by the UE 202. This may cause a failed attempt in listening to any of the predetermined channels successfully and therefore a failed attempt in establishing a connection to the cell of the eNB 200. In an embodiment, the UE 202 may determine the number of failed attempts in establishing the connection to at least one cell, wherein the number of failed attempts is determined for each predetermined channel that is listened to. In other words, the number of failed attempts may be counted separately for each of the predetermined channel. One counter may count the number of failed attempts in listening to the BCH while another counter may count the number of failed attempts in listening to the PCH, for example.

When the data from SCH is received successfully, the UE 202 may obtain knowledge of the cell's ID as explained before, and thus the UE 202 knows which cell the UE 202 is trying to connect to in the ICS process. As the UE 202 can identify the cell, the UE 202 may store information of the failed attempts related to that cell specifically. As a result, the UE 202 may determine the failed attempts in establishing the connection to a specific cell.

In an embodiment, the UE 202 may communicate in step 316 the number of failed attempts for each predetermined channel to a cell to which a connection has been established, wherein the connection to the cell is established when information has been successfully received on each predetermined channel. If the UE 202 does not succeed in establishing connection to the first selected cell, the UE 202 may communicate the information to the cell to which the connection is established. Thus, the cell to which a connection has been established may be the first selected cell, or another cell in case the connection has not been established to the first selected cell. As the information may be cell-specific, the UE 202 may communicate to the connected cell information that relates to at least one specific cell to which the UE 202 has tried to connect to but failed. In addition, the communicated data may relate to the cell to which the connection has been established.

In an embodiment, a maximum allowed time duration for establishing a connection to a cell is set in step 304 of FIG. 3. During this period, the UE 202 may perform the obtaining of the data from the predetermined channels and thus establish the connection to the cell. However, if during this time, one of the steps 308 to 312 of listening to the SCH, the BCH or the PCH has failed, the failure is counted for and the ICS process may be re-instantiated.

This embodiment is shown in FIG. 3 in steps 318 to 332. In step 318 it is noted that the maximum allowed time duration has lapsed. In steps 320 to 324 it is determined which predetermined channel was faulty so that data could not be received from the channel. Once that is determined, the counter, responsible of keeping a count of the number of failed attempts related to the predetermined channel which was listened to but whose information was not successfully received, is incremented in one of the steps 326 to 330. In FIG. 3, a counter A counts the number of failed attempts in establishing a connection to the cell wherein the failure is due to a faulty synchronization channel so that the required information from the SCH was not successfully received, a counter B counts the number of failed attempts in establishing a connection to the cell wherein the failure is due to a faulty broadcast channel so that the required information from the BCH has not been successfully received, and a counter C counts the number of failed attempts in establishing a connection to the cell wherein the failure is due to a faulty paging channel so that the required information from the PCH has not been successfully received. In addition there may be another counter in addition to the counter A, B and C.

After the failure is counted for by the corresponding counter, the process continues to step 332 in which it is checked if counter D is larger than a predetermined threshold T. The counter D and the threshold T will be described later. If D is smaller than T, the UE 202 may re-attempt to establish the connection to the current selected cell.

In other words, if the maximum allowed time duration has not lapsed by the time each predetermined channel has been successfully received, the ICS process is successful in step 314. Otherwise, when the maximum allowed time duration has lapsed and the information from the predetermined channels has not been successfully received, the UE 202 may re-attempt to establish the connection to the currently selected cell.

In an embodiment, there may be determined a maximum number of attempts in establishing a connection to a first cell. In other words, an upper limit for re-instantiation attempts to a certain cell. The first cell may be the first selected cell after analyzing the received signal power strengths in step 302. However, the first cell may also be any cell to which a connection may not have been established due to any reason. The UE 202 may determine how many attempts have been performed in establishing the connection to the first cell. This may be performed by counter D of FIG. 3. Thus, each time the establishment of connection has failed for any reason, the counter D is incremented in steps 326 to 330. Thus, the counter D may be a summed value of counters A, B and C. In other words, D=A+B+C. Therefore as an alternative, the counter D need not exist and the sum of A, B and C may be obtained with an adder. If, in the first attempt to establish a connection, the SCH channel is faulty, the counters A and D are incremented in step 326. In the second attempts, the SCH may be correctly received but the BCH may be faulty, then counter B and counter D are incremented in step 328. If the third attempt is successful for every channel, the connection may be established to the cell with the following counter values: A=1, B=1, C=0, and D=2.

There may also be a predetermined threshold T set against which the counter D value is compared in step 332. When the maximum number of attempts in terms of the first cell has been reached, that is D is larger than T, the UE 202 may attempt to establish a connection to second cell. In other words, the UE 202 may in step 334 select another cell for trying to establish the connection to (that is, to perform the ICS procedure to another cell). This is advantageous so that the UE 202 is not stuck in a situation where it tries to connect to the first selected cell again and again even thought the first selected cell is faulty.

Once the connection has been established to a cell, (which can be the first selected cell or another cell to which a connection has been established to) the UE 202 communicates the counter values to the connected cell. This is advantageous so that once the eNB 200 has established a connection to the UE 202, the eNB 200 obtains the number of failed attempts in establishing a connection to at least one cell, wherein the obtained information indicates the number of failed attempts for each predetermined channel that is listened to by the UE 202. Thus, the eNB 202 obtains the information regarding each channel at the same time as one log report. This is enabled by a log of failure information generated and stored by the UE 202. The log can then be transmitted to the eNB 200 when a connection has been established. The eNB 200 may apply the obtained information in determining the condition of the at least one cell. The meaning of at least one cell is that the information may relate to the connected cell only, and/or at least one previous cell to which connection has not been established even though attempts have been made.

The counters A, B, C and D may be stored for each eNB to which connection has been attempted to. When SCH failure occurs the UE 202 increments the counter A and the counter D without knowing the ID of the cell to which the connection is attempted to. If counter D exceeds the threshold T, UE may temporarily blacklist this cell (meaning to ignore the one with strongest signal strength) and select the second strongest signal of another cell. At the time of successful connection with this cell or another cell, the UE 202 reports all counters to the connected cell even without knowing the ID of the previous cell to which connection was attempted to but failed.

An exemplary failure log comprising the counter values reported to a third attempted cell (when the first two were faulty) may be as follows: regarding cell 1: A=100, B=0, C=0, D=100; regarding cell 2: A=2, B=98, C=0, D=100; and regarding cell 3: A=7, B=1, C=5, D=13. In the previous it is assumed that the 100 attempts is the threshold T (the maximum number of attempts allowed for a cell). Thus, the third cell obtains knowledge of each cell's channel failures and may exchange the data with neighboring cells via the X2 interface and/or with a network management system (NMS) or to a operational support system (OSS). Even though the UE may not know the ID of the first cell (as the SCH constantly failed), the UE sends the counter values for this unidentified first cell so that the counter values are distinctive from the other cells' counter values. The UE thus stores the counter values for each cell separately, and when a successful connection is established, the UE reports the stored and current counter values to the connected cell.

Figure 4:
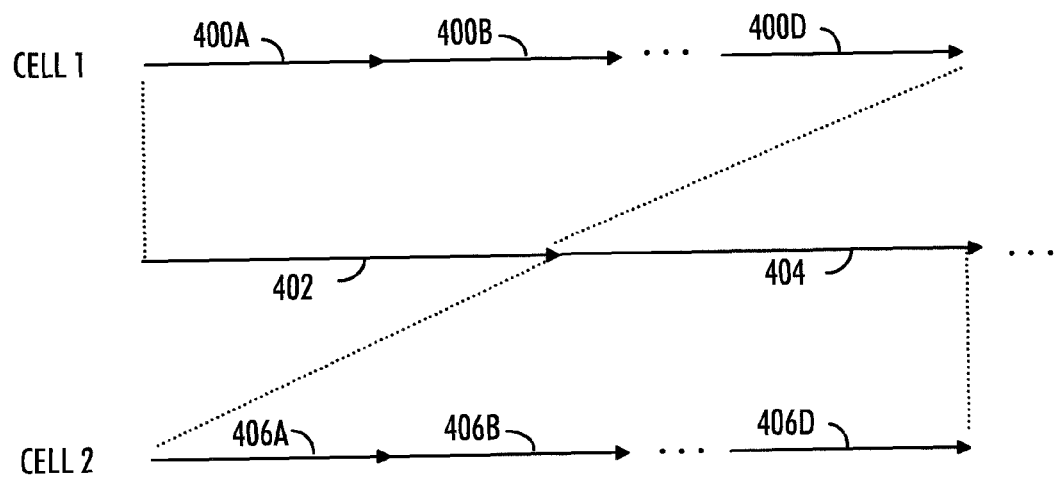
FIG. 4 illustrates a time line and related parameters, according to an embodiment.

FIG. 4 discloses the maximum allowed time duration and the maximum number of attempts. The reference numeral 400A to 400D represent the maximum allowed time duration for establishing the connection to a cell. When the time duration 400A has passed, the UE 202 may re-try to perform the ICS process with the same cell within time duration 400B. If time duration 400B lapses without successful connection establishment, duration 400C for the same cell is triggered on, and so on. Let us assume that the maximum number of attempts allows four attempts to one cell, as shown with reference numeral 402 comprising the time periods 400A to 400D. When the duration 400D passes without connection to the cell, the UE 202 selects another cell to connect to and triggers the ICS process with the new cell, as shown with reference numeral 404 comprising time periods 406A to 406D. The reference numeral 404 may comprise another set of four time durations 406A to 406D, or alternatively another number of attempts, for example five attempts. If the connection has not been established to the second cell within the four attempts 406A to 406D, a third cell may be selected for the ICS process, etc.

In an embodiment, the UE 202 may generate localization data corresponding to each failed attempt of establishing a connection to at least one cell. Thus, the localization data may be time stamped. The time stamp may correspond to the point in time when the attempt to establish a connection to a cell has been performed. The data may be generated or obtained with the help of a global positioning system (GPS). In addition, the UE 202 may use the received signal powers from different eNBs 200 in order to determine the location of the UE 202. The UE 202 may then communicate the localization data to the cell to which the connection has been established. As a result, the eNB 200 obtains the localization data corresponding to each failed attempt of establishing a connection to at least one cell. The information may comprise localization data that is related to another cell or cells than the one to which the connection has been established. The eNB 200 may apply the obtained localization data in determining whether a specific area is prone to cause a failed connection establishment attempt. In other words, the data may be used as an input for fault and degradation detection, cell outage compensation and also for coverage optimization.

In an embodiment, when the UE 202 reports a problem with the eNB 200 in certain area of the cell (identified by the localization data), later on a UE (the same UE 202 or another UE but in the same area) can be requested to measure and report its radio condition. Thus, the eNB 200 may request a user equipment to provide further information related to the radio condition of the specific area, when the user equipment locates in the specific area. If a certain cell is found faulty/degraded, the cell may be restarted or the configuration parameters of the cell may be reset. Later, this eNB may request other UEs to report further information to determine whether problem is solved, for example. The eNB 200 may apply the provided further information in determining which corrective action is to be used in the cell in order to prevent the failed connection establishment to occur. The corrective action may comprise automatic adjustment of network and radio parameters (e.g., antenna tilt or transmission power), for example.

The obtained localization data may be applied also in creating coverage hole-maps when the type of malfunction (i.e., which channel failed) is reported together with user's position. This is advantageous so that operators may apply the coverage hole-maps in designing the network for communication. The coverage hole-map may correspond to at least one cell, not necessarily the presently connected cell.

Let us take a closer look at FIG. 3 and the procedure of ICS with different possible outcomes of the ICS. If the synchronization has failed meaning that UE 202 is unable to receive the synchronization reference signal in step 308 within the maximum allowed time limit set for the ICS procedure to complete, the UE 202 terminates the ICS process and increments the count of failed synchronization attempts, possibly stores the UE's 202 time stamped localization information, and then re-instantiates a new attempt to the same cell. If the re-attempt succeeds, the UE 202 may report the number of failed attempts for each step (for each counter), possibly along with the localization information, to the cell (to the eNB 200). If synchronization fails again and the number of the failed attempts exceeds the upper limit T, then the UE 202 may continue to search for the second strongest (or some a strong) cell. If the UE 202 does not recognize any cell, it acts as if it was in a coverage-hole area. Thus, once a connection to a cell is established and the data reported to the eNB of the connected cell, the localization information may then be utilized to determine the coverage holes in the network.

If the cell selection process passes the synchronization step and the broadcast channel fails meaning that the UE 202 is unable to receive the broadcast information within the time limit set for the cell selection procedure to complete, then the UE 202 terminates the ICS process and increments the count for the failed broadcast attempts for this specific cell whose physical ID it already knows from the successfully received SCH, possibly stores the UE 202 localization information with timestamp, and re-instantiates a new attempt to connect to the same cell. If the re-instantiation succeeds then the UE 202 shall report the number of failed attempts for each step (each predetermined channel) and possibly the localization information with timestamp to the connected cell. If the UE 202 fails to receive the BCH information again and the number of the failed attempts exceeds the upper limit T, the UE 202 may continue to search for another cell.

If the cell selection process passes the synchronization and the broadcast steps and the paging channel fails meaning that the UE 202 may not change from RRC_IDLE state to RRC_CONNECTION state (causing the UE 202 not to start making random access attempts via uplink RACHs) within the set maximum allowed time duration, the UE 202 terminates the ICS process and increments the count for the failed paging attempts for this cell whose physical ID it already knows, possibly stores the UE localization information with timestamp, and then it re-instantiates a new attempt to connect to the same cell. If the re-instantiation succeeds, then the UE 202 may report the number of failed attempts for each step and possibly the UE's 202 localization information with timestamp to the cell. If the UE 202 again fails to receive the paging information within the time limit and the number of the failed attempts exceeds the upper limit T, the UE 202 may continue to search for another cell to connect to.

If the UE 202 establishes a connection with another cell, the UE 202 may report the number of failed attempts for each physical channel 204 to 208 and possibly also the UE's 202 localization information, wherein the reported information may relate to the previous ICS attempts regarding another cell than the connected cell. Naturally information related to the current cell may also be reported. The eNB of the connected cell may collect this information from the connected UEs (such as the UE 202). Thus the connected eNB may keep a record of failed attempts to other cells. This may include information related to the broadcast channel and the paging channel, for example, on a cell individual basis. Thus, the communicated information related to at least one cell may be cell-specific when the identification of the at least one cell corresponding to the communicated information is known. As explained earlier, the ID may be obtained through a successful SCH reception.

Figure 5:
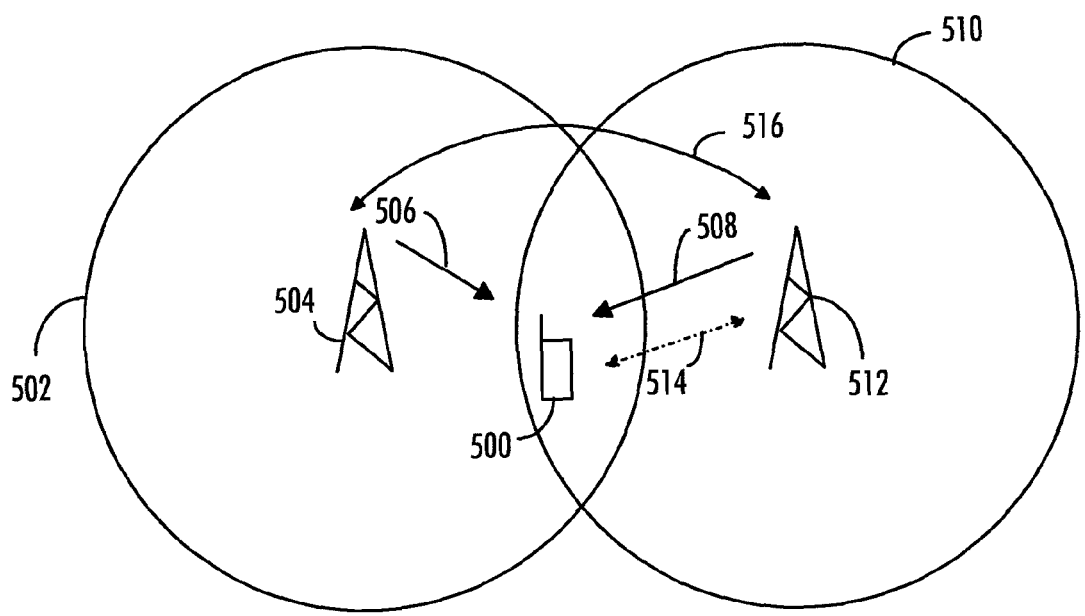
FIG. 5 shows another radio communication network according to an embodiment.

The situation where the UE does not succeed in establishing a connection to the first selected cell is shown in FIG. 5. In FIG. 5, a UE 500, after scanning the frequencies, selects a cell 502 and a corresponding eNB 504 as the cell to which connection is to be established in the first place. The selection may be due to the fact that the received signal 506 is stronger than the received signal 508 from the neighboring cell 510 and its corresponding eNB 512. After having selected the eNB 504 to connect to, the UE 500 listens to the predetermined channels from the eNB 504. Let us assume that for some reason, the connection to the cell 502 could not be established (for example, some channel was faulty). As a consequence, the UE 500 selects another cell to connect to. The UE 500 may select the eNB providing the second strongest signal to connect to, for example. Thus, it is not necessary to know the ID of the previous, failed cell. Basically, if the signal strength is different than the previous one, it indicates that the current cell may be a different cell that the previous one. This time, the cell 510 with the corresponding eNB 512 is selected. The UE 500 then listens to the predetermined channels from the eNB 512. After having successfully received data from each predetermined channel, the UE 500 has established a connection 514 to the eNB 512. Then the UE 500 may communicate information related to the failure information of the cell 502 and possibly also related to the connected cell 510 (if there were failed attempts before the successful connection was established). As the eNB 512 obtains the information, it may transmit the information to other eNBs (such as the eNB 504) via X2 interface 516 so that other eNBs 504 may perform corrective actions related to the cell's radio access.

Figure 6:
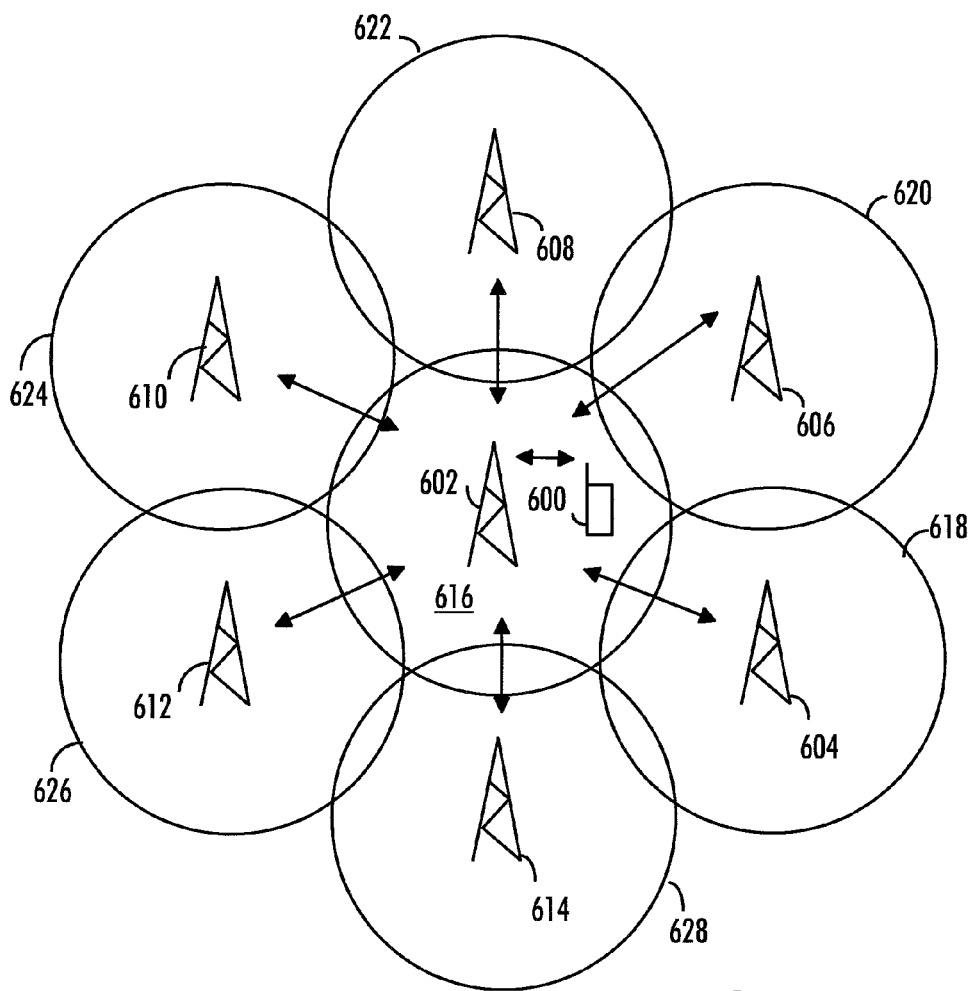
FIG. 6 shows another radio communication network according to an embodiment.

The X2 interface between eNBs may possibly be utilized also to get information about several cells on base station level and thus speed up the process of cell condition detection. In other words the information can then be applied in self-organizing networks (SON). This is shown in FIG. 6, where the UE 600 is connected to an eNB 602 of a cell 616. The UE 600 may communicate the information related to the failed connection establishment attempts for each channel to the connected eNB 602. The connected eNB 602 may be the first selected eNB or another eNB. The eNB 602 may then communicate the received information to each of the neighboring eNBs 604 to 614 of the corresponding cells 618 to 628 via the X2 interfaces, for example. This way the eNBs 602 to 614 obtain knowledge of other eNBs faulty channels. For example, the information related to broadcast channel and paging channel of a failed cell may be exchanged between affected cells in order to provide feedback on failure events which are not at that moment visible to the network.

In an embodiment, the eNB of FIG. 5, for example, may determine a certain cell as degraded in terms of the condition of the cell when the number of failed attempts in convection establishment to the certain cell exceeds a predetermined threshold. Thus, the eNB 512 may declare the cell 502 with the eNB 504 as degraded if UEs (such as the UE 500) report a certain number failed attempts in establishing connection to the cell 502. For example, when failed attempts occur on a regular basis on the BCH or the PCH of the cell 502, the cell 502 may be declared to be in a suspicion state. If the suspicion state continues for a certain time the cell is called degraded. This information may be useful for the diagnosis of the cell degradation. The predetermined threshold and the certain time duration may be pre-configured to the system and possibly dynamically adapted.

In an embodiment, each eNB may maintain a neighborhood table that contains information about neighboring cells (including the eNB itself) in terms of the number of failed attempts in establishing a connection for different the predetermined channels. The table may also contain the UE's localization information with a corresponding timestamps. The information may be utilized as an input for fault detection, cell outage compensation and/or coverage optimization tasks. The information may also be used in declaring the suspicion or the degradation state of any cell. The information may be on cell-individual basis. The cell, which keeps such a table, may itself declare the suspicion state or the degraded state for any cell (including itself). The declaration of the suspicion state or the degraded state may be based on the information comprised in the table.

Figure 7:
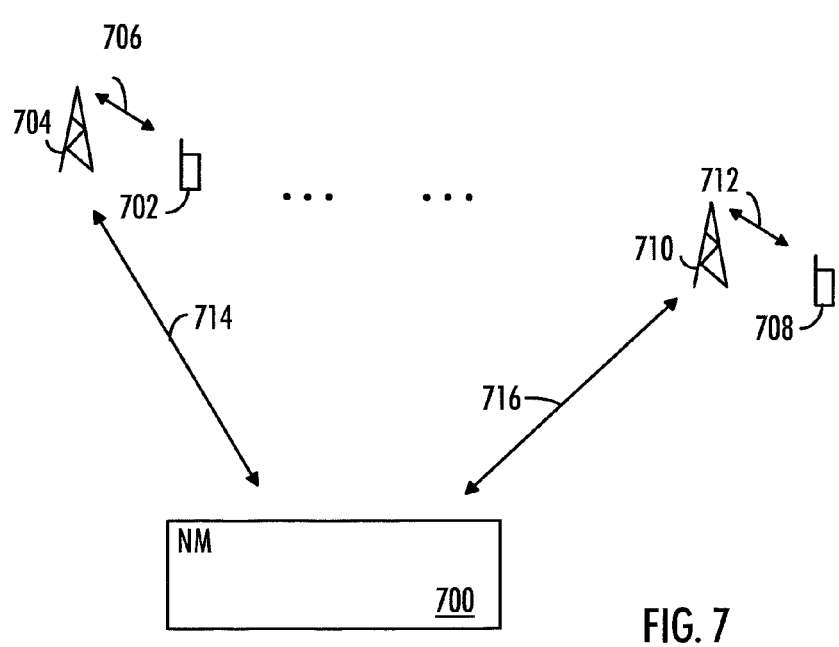
FIG. 7 shows another radio communication network according to an embodiment.

In an embodiment as show in FIG. 7, an eNB may communicate the obtained information to a further network element in stead of or in addition to transmitting the data via X2 to other eNBs. As shown in FIG. 7, UEs 702 and 708 are connected via connection links 706 and 712 to eNBs 704 and 710, respectively. There may also be more UEs as indicated with the dots between the two UEs 702 and 708 in FIG. 7. After the eNBs 704 and 710 have received the failure information from the connected UEs 702 and 708, respectively, the eNBs 704 and 710 may transmit the obtained information to a central unit 700, such as a network manager (NM), via connection links 714 and 716, respectively. The connection links 714 and 716 may be S1 connection links, for example. Thus the central unit 700 obtains information of the number of failed attempts in receiving information related to establishing the connection to each cell of a radio communication network. That is, each cell (eNB) may report the information to the central unit 700. The central unit 700 may then determine the condition of at least one cell 704 and 710 on the basis of the obtained information. This way, the central unit 700 may declare the suspicion state or the degraded state for any cell. Further, the central unit 700 may trigger actions such as alarms, diagnosis and compensation, when the obtained information gives reason to do so. For example, when many UEs report failed attempts related to a certain cell and related to a BCH, the central unit 700 may inform the corresponding eNB to perform corrective actions related to the BCH channel, such as increasing the transmit power of the BCH. The advantage of declaring the suspicion or degradation state by the network manager 700 level instead on the base station level is that it can be based on a much larger source of information, as this source consists of a much wider set of UEs and eNBs.

The reporting from the UE to the connected eNB may be done by logged reporting, etc. In logged reporting the data is reported in one log rather than separately after each channel failure. The data in this way simultaneously indicate the number of failed attempts for each predetermined channel that is listened to by the user equipment. Thus, by avoiding limitations on measurements and limitations related to the collection of the measurements, the UE collects the gathered information to one log rather than reports the failures individually. In other words, the UE does not have to wait for any of the channels to be declared faulty (as a result of certain number of failed of failed attempts), but the UE stores a log of failure information for each and every failed attempt and reports this information in one log on the next successful connection to the cell that has been connected (the connected cell could the first selected cell or another cell, such as one of the neighbors). For example, the UE reports the failure attempts number even when UE makes a couple of failed attempts but then succeeds in establishing the connection. This may be helpful in detecting partial degradation of any of the listened physical channels.

The facts that each channel failure is reported to the next connected eNB and that there does not have to be a certain number of failures before the channel failure is reported, are advantageous in avoiding the limitation related to the number of attempts. Further, an operator does not have to guess how many times the UE has failed before establishing a successful connection. This is possible because the connected eNB always gets a report of the possible failures. This may be important in getting a reliable diagnosis of the condition of at least one cell, not only the connected cell but also the previous cells to which connection establishment was tried but failed.

If there were a certain number of failed attempts needed before the reporting takes place, the eNB might never get the number of failures for the cell. Further, if the threshold for attempts was set blindly without any maximum allowed time duration, it could result in several unnecessary cycles before the transmission of the report is triggered. Therefore, the embodiments produce more reliable results on cell condition determination.

The embodiments are also advantageous so that the amount of drive tests may be reduced, thus saving expenses and labor hours. This is possible because the embodiments may be applied in self-organizing networks.

Very general architectures of apparatuses according to an embodiment are shown in FIG. 8. FIG. 8 show only the elements and functional entities required for understanding the apparatuses according to an embodiment. Other components have been omitted for reasons of simplicity. The implementation of the elements and functional entities may vary from that shown in FIG. 8. The connections shown in FIG. 8 are logical connections, and the actual physical connections may be different. The connections can be direct or indirect and there can merely be a functional relationship between components. It is apparent to a person skilled in the art that the apparatuses may also comprise other functions and structures.

The apparatus 800 for determining a condition of a cell may comprise a processor 802, and the apparatus 820 for communicating information related to a condition of at least one cell may comprise a processor 822. The processors 802 and 822 may each be implemented with a separate digital signal processor provided with suitable software embedded on a computer readable medium, or with a separate logic circuit, such as an application specific integrated circuit (ASIC). The processors 802 and 822 may each comprise an interface, such as computer port, for providing communication capabilities. The processors 802 and 822 may each be, for example, a dual-core processor or a multiple-core processor.

The apparatus 800 may be applied in an eNB or in the central unit 700 of FIG. 7, for example. The apparatus 820 may be applied in a UE, for example.

The apparatus 800 may comprise a memory 804 connected to the processor 802. However, memory may also be integrated to the processor 802 and, thus, no memory 804 may be required. The memory may be used in storing the neighborhood table or any other information related to at least one cell, wherein the information may be obtained from a UE or from an eNB. The information may include the number of failed attempts for each channel and for each cell. Further, the data may comprise localization information of the UE, wherein the localization information is possibly time-stamped.

The apparatus 800 may further comprise a transceiver (TRX) 806. The TRX 806 may further be connected to one or more antennas 808 enabling connection to and from an air interface. The TRX 806 may be used in transmitting and receiving data to and from the radio air interface.

The processor 802 may comprise a radio control circuitry 812 for performing radio resource management related tasks, radio access parameter tuning, fault detection, cell outage compensation, coverage optimization tasks, corrective actions related to cell degradation, such as increasing transmit power of a certain channel, etc.

The processor 802 may comprise a cell condition determination circuitry 810 for determining the condition of at least one cell on the basis of the received information related to the failed attempts in establishing a connection to at least one cell, wherein the failure information is given for each of the predetermined channels. Thus, the condition of at least one cell may be determined on the basis of the failure log report obtained from a UE or from an eNB. The cell may be determined as being in the suspicious state or in the degraded state, for example. For example, if SCH of a certain cell is faulty (meaning that the UE did not obtain its ID, the UE's neighbors may obtain, once the UE is connected to some of the neighbors, the SCH failure logs from the eNB connected to the UE. As a result, the cell receiving the SCH failure logs, may set its neighbors and itself to the suspicion state as the eNB may not know which cell is the one with SCH failure. Consequently further investigations (for example, in a centralized manner identification) may confirm which cell is degraded/faulty.

According to an embodiment, one possible solution for knowing the ID of the cell to which a connection was attempted to be established is to use the localization or positioning data and the corresponding timestamp information which the UE stored at the time of failure. This may enable to identify the faulty cell with some likelihood.

When positioning/localization information is not available, the following may be applied: all counters values may be stored at the eNB and may be exchanged between neighboring eNBs via the X2 interface, and/or also sent to a network management system (NMS) or to a operational support system (OSS). The SCH failure information may be utilized by the NMS/OSS to detect cell degradation. For example, let us assume that there are 100 SCH failures in a cell 1. The UE 1 increments the counter A 100 times without knowing the ID of the cell in question. At the time of successful connection to cell 2, for example, the UE 1 reports all counters to the cell 2. Now the cell 2 may realize that there is a huge amount of UE's that are experiencing SCH failures either in its own coverage area or in the neighboring cell's coverage area.

Let us further assume that another UE 2 has incremented the counter A to 80. At the successful connection with another neighbor cell 3, the UE 2 may report all failures to the cell 3. Now the cell 3 also realizes that there is huge amount of UE's facing problem with synchronization channel, these failures may be in its own cell or one of the neighboring cells. The information related to synchronization channel failures may be sent to the NMS/OSS. Then it may be the task of the NMS/OSS to identify with some likelihood that among these three cells (cell 1, cell 2, and cell 3), one is the faulty cell. Thus, on the basis of at least one obtained number of failed attempts in listening to the synchronization channel, the NMS/OSS (or some base station) may determine, with a likelihood, which cell is degraded when the identification of at least one cell is not known.

The cell condition determination circuitry 810 may also request further information from any UE, if seen appropriate. The cell condition circuitry 810 may also be used in applying the obtained localization data in determining whether a specific area of any cell is prone to cause a failed connection establishment attempt. That is, if a UE at some location is deemed to receive poor radio signal from a cell so that the UE will is most likely not able to establish a connection to the cell.

The NMS/OSS after receiving the failure logs may, on the basis of the cell-specific counter values, declare the reporting cell and its neighbors to be in a suspicious state. The NMS/OSS may then perform further acts to find out the faulty/degraded cell out of all the suspicious cells.

For example, the NMS/OSS may instruct the suspicious eNBs/cells to request each UE in the coverage area of these suspicious eNBs to report additional information corresponding to each attempt in establishing a connection to the suspicious eNBs. The additional information may comprise, for example, the localization information along with timestamp but also further information, such as a reference signal received power (RSRP), signal quality, timing information, etc. The received additional measurement information may then be utilized in identifying the faulty/degraded cells (with more certainty) in the network. Accordingly, the NMS/OSS may identify more than one unidentified faulty/degraded cells in the network.

The apparatus 820 may comprise a memory 824 connected to the processor 822. However, memory may also be integrated to the processor 822 and, thus, no memory 824 may be required. The memory may be used in storing the counted number of failed attempts for each predetermined channel. Further, the memory may be used to store information related to cells to which the apparatus 820 has tried to make a contact with, such as the physical ID of each cell.

The apparatus 820 may further comprise a transceiver (TRX) 826. The TRX 826 may further be connected to one or more antennas 828 enabling connection to and from an air interface. The TRX 826 may be used in transmitting and receiving data to and from the radio air interface. For example, the TRX 826 may transmit the log of failure information to the connected eNB.

The processor 822 may comprise a radio control circuitry 832 for performing radio access related task, adapting transmission parameters, deciding which cell to try to connect to, etc.

The processor 822 may comprise a measuring circuitry 830 for performing the determination of the number of failed attempts for each channel. The measuring circuitry 830 may comprise a counter for each predetermined channel and a total counter for counting the number of total attempts per each cell. The measuring circuitry 830 may further determine the maximum allowed time duration and the maximum number of failed attempts. The measuring circuitry 830 may further determine the time stamped localization data. For this purpose, the measuring circuitry 830 may be equipped with a GPS, or other positioning system. The measuring circuitry 830 may also determine the signal strengths received from different eNBs.

Thus the apparatus 820, when encountering problems with a connection to the network before getting dedicated resources, determines the number of failed attempts for each physical channel, keeps the data and transfers it to a subsequent cell, when and to which connection is established to.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present.

This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

FIG. 9 shows a method for communicating information. The method begins in step 900. In step 902, the method comprises listening to at least one predetermined channel in order to select a cell to which a connection is to be established. In step 904, the method comprises determining the number of failed attempts in establishing a connection to at least one cell, wherein the number of failed attempts is determined for each predetermined channel that is listened to. In step 906, the number of failed attempts for each predetermined channel is communicated to a cell to which a connection has been established, wherein the connection to the cell is established when information has been successfully received on each predetermined channel. The method ends in step 908. FIG. 10 shows a method for determining a condition of a cell. The method begins in step 1000. In step 1002, the method comprises establishing a connection to a user equipment, wherein the connection is established when information has been successfully transmitted to the user equipment on each of the at least one predetermined channel. In step 1004, the method comprises obtaining the number of failed attempts in establishing a connection to at least one cell, wherein the obtained information indicates the number of failed attempts for each predetermined channel that is listened to by the user equipment. In step 1006, the obtained information is applied in determining the condition of the at least one cell. The method ends in step 1008.

The techniques and methods described herein may be implemented by various means. For example, these techniques may be implemented in hardware (one or more devices), firmware (one or more devices), software (one or more modules), or combinations thereof. For a hardware implementation, the apparatuses of FIG. 8 may be implemented within one or more application-specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, other electronic units designed to perform the functions described herein, or a combination thereof. For firmware or software, the implementation can be carried out through modules of at least one chip set (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Thus, according to an embodiment, the apparatus for performing the tasks of FIGS. 1 to 7 and 9 comprises interfacing means for listening to at least one predetermined channel in order to select a cell to which a connection is to be established, processing means for determining the number of failed attempts in establishing a connection to at least one cell, wherein the number of failed attempts is determined for each predetermined channel that is listened to, and interfacing means for communicating the number of failed attempts for each predetermined channel to a cell to which a connection has been established, wherein the connection to the cell is established when information has been successfully received on each predetermined channel.

According to an embodiment, the apparatus for performing the tasks of FIGS. 1 to 7 comprises interfacing means for establishing a connection to a user equipment, wherein the connection is established when information has been successfully transmitted to the user equipment on each of the at least one predetermined channel, processing means for obtaining the number of failed attempts in establishing a connection to at least one cell, wherein the obtained information indicates the number of failed attempts for each predetermined channel that is listened to by the user equipment, and processing means for applying the obtained information in determining the condition of the at least one cell.

Embodiments of the invention may be implemented as computer programs in the apparatuses according to the embodiments. The computer programs comprise instructions for executing a computer process according to embodiments. The computer programs implemented in the apparatuses 800 and 820 may carry out, but is not limited to, the tasks related to FIGS. 1 to 7 and 9. The computer program may be stored on a computer program distribution medium readable by a computer or a processor. The computer program medium may be, for example but not limited to, an electric, magnetic, optical, infrared or semiconductor system, device or transmission medium. The computer program medium may include at least one of the following media: a computer readable medium, a program storage medium, a record medium, a computer readable memory, a random access memory, an erasable programmable read-only memory, a computer readable software distribution package, a computer readable signal, a computer readable telecommunications signal, computer readable printed matter, and a computer readable compressed software package.

Even though the invention has been described above with reference to an example according to the accompanying drawings, it is clear that the invention is not restricted thereto but can be modified in several ways within the scope of the appended claims. Further, it is clear to a person skilled in the art that the described embodiments may, but are not required to, be combined with other embodiments in various ways.

The invention claimed is:

1. A method for communicating information related to a condition of at least one cell, the method comprising:
listening to at least one predetermined channel in order to select a cell to which a connection is to be established, characterized by the method further comprising:
determining the number of failed attempts in establishing a connection to at least one cell, wherein the number of failed attempts is determined for each predetermined channel that is listened to; and
communicating, to a cell to which a connection has been established, the number of failed attempts for each predetermined channel of each cell that was previously attempted to make a connection to, wherein the connection to the cell is established when information has been successfully received on each predetermined channel.

2. The method of claim 1, the method further comprising:
communicating the number of failed attempts to the cell to which a connection has been established, wherein the number of failed attempts relates to at least one cell to which a connection was attempted to be established but was not established.

3. The method of claim 1, the method further comprising:
setting a maximum allowed time duration for establishing a connection to a cell; re-attempting to establish the connection to the same cell when the maximum allowed time duration has lapsed; and incrementing the number of failed attempts related to the predetermined channel which was listened to but whose information was not successfully received.

4. The method of claim 1, the method further comprising:
setting a maximum number of attempts in establishing the connection a first cell; determining how many attempts have been performed for establishing the connection to the first cell; and attempting to establish a connection to second cell when the maximum number of attempts in terms of the first cell has been reached.

5. The method of claim 1, the method further comprising:
generating localization data corresponding to each failed attempt of establishing a connection to at least one cell; and communicating the localization data to the cell to which the connection has been established.

6. An apparatus for communicating information related to a condition of at least one cell, comprising:
at least one processor and at least one memory storing computer program code, wherein the at least one memory and the stored computer program code are configured to, with the at least one processor, cause the apparatus at least to:
listen to at least one predetermined channel in order to select a cell to which a connection is to be established, characterized by the apparatus being further caused to:
determine the number of failed attempts in establishing a connection to at least one cell, wherein the number of failed attempts is determined for each predetermined channel that is listened to; and
communicate, to a cell to which a connection has been established, the number of failed attempts for each predetermined channel of each cell that was previously attempted to make a connection to, wherein the connection to the cell is established when information has been successfully received on each predetermined channel.

7. The apparatus of claim 6, wherein the apparatus is further caused to:
communicate the number of failed attempts to the cell to which a connection has been established, wherein the number of failed attempts relates to at least one cell to which a connection was attempted to be established but was not established.

8. The apparatus of claim 6, wherein the apparatus is further caused to:
set a maximum allowed time duration for establishing a connection to a cell;
re-attempt to establish the connection to the same cell when the maximum allowed time duration has lapsed; and
increment the number of failed attempts related to the predetermined channel which was listened to but whose information was not successfully received.

9. The apparatus of claim 6, wherein the apparatus is further caused to:
set a maximum number of attempts in establishing the connection a first cell;
determine how many attempts have been performed for establishing the connection to the first cell; and
attempt to establish a connection to second cell when the maximum number of attempts in terms of the first cell has been reached.

10. The apparatus of claim 6, wherein the apparatus is further caused to:
generate localization data corresponding to each failed at-tempt of establishing a connection to at least one cell; and communicate the localization data to the cell to which the connection has been established.

11. A method for determining a condition of at least one cell, the method comprising:
establishing a connection to a user equipment, wherein the connection is established when information has been success-fully transmitted to the user equipment on each of the at least one predetermined channel, characterized by the method further comprising:
obtaining the number of failed attempts in establishing a connection to at least one cell to which a connection was at-tempted to be established, wherein the obtained information indicates the number of failed attempts for each predetermined channel that is listened to by the user equipment; and applying the obtained information in determining the condition of the at least one cell.

12. The method of claim 11, the method further comprising:
obtaining localization data corresponding to each failed attempt of establishing a connection to at least one cell; and
applying the obtained localization data in determining whether a specific area is prone to cause a failed connection establishment attempt.

13. The method of claim 12, the method further comprising:
requesting a user equipment to provide further information related to the radio condition of the specific area when the user equipment locates in the specific area; and
applying the provided further information in determining which corrective action is to be used in the cell in order to prevent the failed connection establishment to occur.

14. The method of claim 11, the method further comprising:
obtaining information of the number of failed attempts in receiving information related to establishing the connection to each cell of a radio communication network; and
determining the condition of at least one cell in the radio communication network on the basis of the obtained information.

15. An apparatus for determining a condition of at least one cell, comprising:
at least one processor and at least one memory storing computer program code, wherein the at least one memory and the stored computer program code are configured to, with the at least one processor, cause the apparatus at least to:
establish a connection to a user equipment, wherein the connection is established when information has been successfully transmitted to the user equipment on each of the at least one predetermined channel,
characterized by the apparatus being further caused to:
obtain the number of failed attempts in establishing a connection to at least one cell to which a connection was at-tempted to be established, wherein the obtained information indicates the number of failed attempts for each predetermined channel that is listened to by the user equipment; and apply the obtained information in determining the condition of the at least one cell.

16. The apparatus of claim 15, wherein the apparatus is further caused to: obtain localization data corresponding to each failed attempt of establishing a connection to at least one cell; and apply the obtained localization data in determining whether a specific area is prone to cause a failed connection establishment attempt.

17. The apparatus of claim 16, wherein the apparatus is further caused to:
request a user equipment to provide further information related to the radio condition of the specific area when the user equipment locates in the specific area; and
apply the provided further information in determining which corrective action is to be used in the cell in order to prevent the failed connection establishment to occur.

18. The apparatus of claim 15, wherein the apparatus is further caused to:
obtain information of the number of failed attempts in receiving information related to establishing the connection to each cell of a radio communication network; and
determine the condition of at least one cell in the radio communication network on the basis of the obtained information.

19. A non-transitory computer readable memory in which is stored program instructions which, when executed by at least one processor of an apparatus, causes the apparatus to perform at least:
listen to at least one predetermined channel in order to select a cell to which a connection is to be established;
determine the number of failed attempts in establishing a connection to at least one cell, wherein the number of failed attempts is determined for each predetermined channel that is listened to; and
communicate, to a cell to which a connection has been established, the number of failed attempts for each predetermined channel of each cell that was previously attempted to make a connection to, wherein the connection to the cell is established when information has been successfully received on each predetermined channel.

20. A non-transitory computer readable memory in which is stored program instructions which, when executed by at least one processor of an apparatus, causes the apparatus to perform at least:
establish a connection to a user equipment, wherein the connection is established when information has been success-fully transmitted to the user equipment on each of the at least one predetermined channel;
obtain the number of failed attempts in establishing a connection to at least one cell to which a connection was attempted to be established, wherein the obtained information indicates the number of failed attempts for each predetermined channel that is listened to by the user equipment; and apply the obtained information in determining a condition of the at least one cell.

\* \* \* \* \*